Patent 3,297,031 — Suppository Applicator

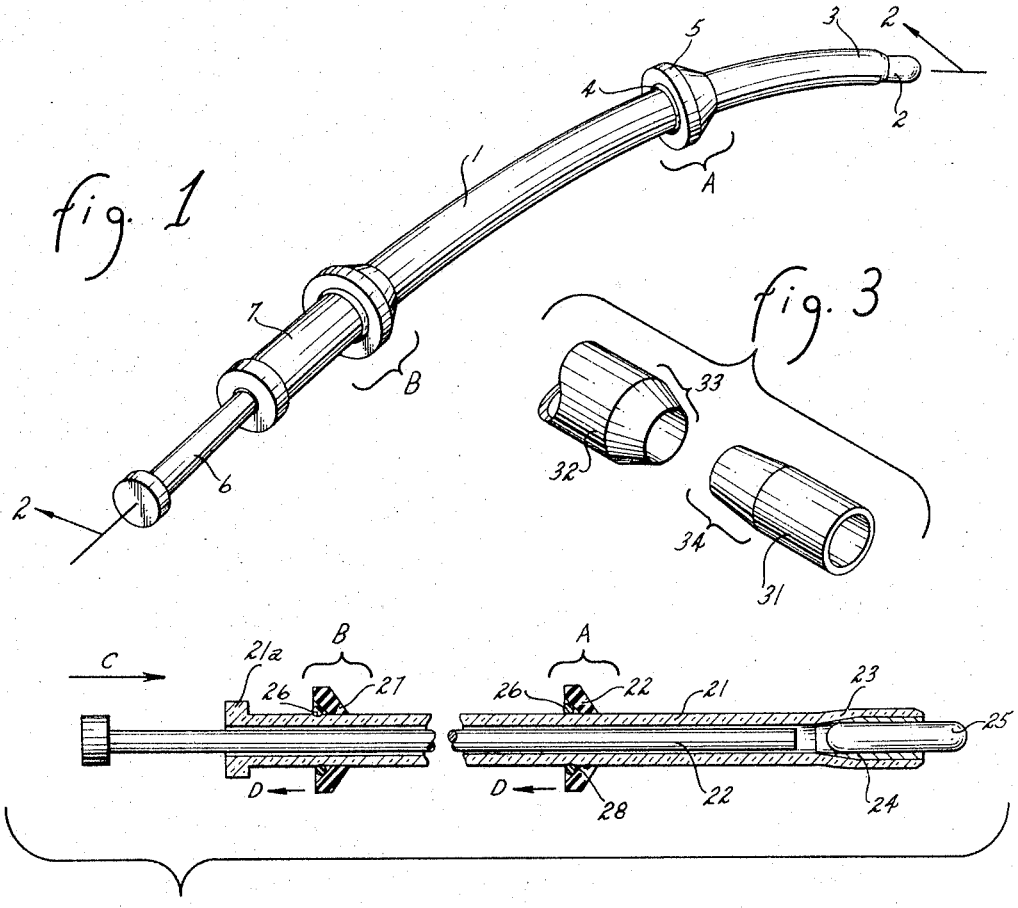
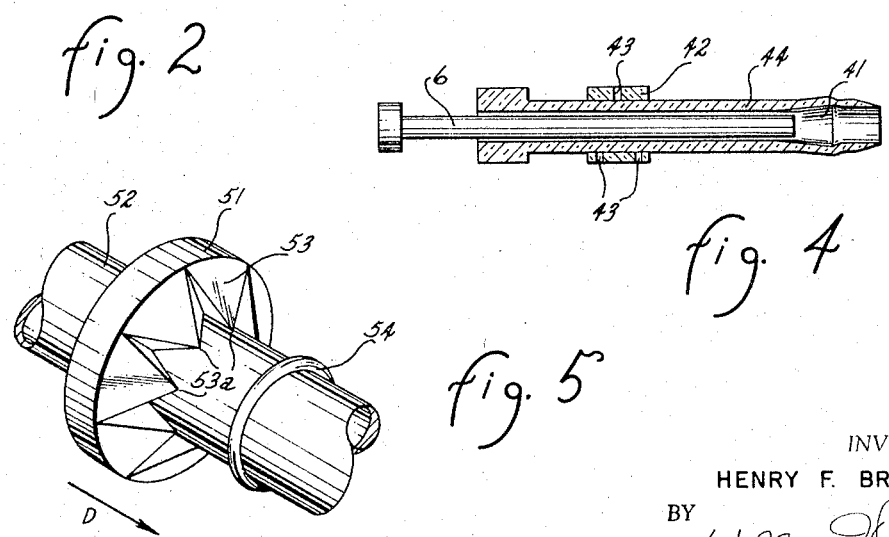

3,297,031
SUPPOSITORY APPLICATOR
Henry F. Bray, 1324 W. Knox St., Tucson, Ariz. 85705
Filed Feb. 7, 1966, Ser. No. 525,628
2 Claims. (Cl. 128—264)

This application is a continuation-in-part of my copending applications Serial No. 300,265, filed August 6, 1963, now abandoned, Serial No. 309,431, filed September 17, 1963, and Serial No. 350,342, filed March 9, 1964.

This invention relates to an improved novel suppository applicator. More particularly, the invention concerns such suppository applicators having a novel, adjustably positionable stop member providing convenient means for positioning the applicator within a body cavity.

In a further aspect, the invention concerns improved suppository applications having a novel suppository retaining element providing proper positioning of the suppository within the applicator prior to its ejection therefrom.

In a still further aspect, the invention concerns a novel positioning stop device for a suppository applicator which is adjustably positionable only when the device is wet.

In yet another aspect, the invention concerns a novel ejecting plunger for a suppository applicator, the plunger being flexible but non-collapsible to provide effective ejecting action.

Recent research in the problem of inducing defecation by means of rectal contact laxative suppositories has demonstrated the desirability, if not criticality, in the proper placement of the suppository within the rectal cavity. The proper placement of the suppository is required in order to prevent discomfort to the patient, manifested by a burning sensation, irritation, and a sensation of urgency. Proper placement is also required in order to provide the proper functional response; it being necessary also to provide proper placement in order to avoid inserting the suppository into a fecal mass where it cannot make contact with the rectal mucosa.

Both of the aforestated objectives, namely, the avoidance of patient discomfort and the obtention of proper functional response are obtained by placing the rectal contact laxative suppository at a high point in the rectal cavity in comparison with the normal point previously obtainable by manual insertion techniques.

Heretofore, no satisfactory apparatus for the achievement of the aforestated objective of high placement of the contact suppository have been available. Furthermore, due to the variation in physical dimensions of the rectal cavity from patient to patient, no uniform length of inserting apparatus can be employed unless appropriate and effective means are associated with such instruments for positioning the apparatus to suit the needs of each individual patient. Additionally, because of the sanitary problems involved, it would be highly desirable to provide apparatus for the insertion of contact suppositories which can be quickly, conveniently, and effectively sterilized or, alternatively, to provide suitable apparatus which can be economically disposable after each use.

It is therefore a principal object of the present invention to provide suitable apparatus for the insertion of rectal contact laxative suppositories;

Another prime object of the invention is the provision of such apparatus which can be employed to insert rectal contact laxative suppositories in accordance with the most recently recommended techniques, as hereabove described;

Another object of the invention is the provision of a suppository applicator having an adjustably positionable stop member;

Still another object of the invention is the provision of such an applicator in which the adjustably positionable stop member provides a means of regulating the height of insertion of the applicator into the rectal cavity;

Yet another object of the invention is the provision of a stop member for a rectal suppository applicator which is adjustably positionable upon the applicator only when the applicator is wet;

Other objects, features and advantages of my invention will be readily apparent to those skilled in the art from the following detailed description thereof taken in conjunction with the drawings.

FIG. 1 is an external perspective view of a rectal suppository applicator embodying the present invention;

FIG. 2 is a cross-sectional view of the embodiment chosen for purposes of illustration in FIG. 1, taken along section line 2—2 of FIG. 1;

FIG. 3 is a partial perspective view of the forward tip of the apparatus of FIGS. 1 and 2 showing the method of inserting a suppository retaining ring therein;

FIG. 4 is a cross-sectional view of another embodiment of the invention having a different tip construction and a different stop member construction;

FIG. 5 is a partial perspective view of a stop member which can be used on either the devices of FIGS. 1-3 or FIG. 4.

Briefly, in accordance with my invention I accomplish the aforestated objectives and achieve the desired advantages by providing an applicator for rectal contact laxative suppositories comprising a resilient tubular member adapted for insertion into the rectal cavity, a substantially solid suppository retaining ring disposed within the forward end of the tubular member, a resilient flexible plunger rod for forceably ejecting a suppository from the retaining ring, and a stop member slidably adjustably disposed upon the tubular member.

The resilient tubular member, advisably formed of a soft but tough rubber or plastic-like material, especially a vinyl plastic or the like, has a substantially smooth, continuous outer surface and the outside diameter is adapted for comfortable insertion into the rectal cavity. The length of the tubular member is sufficient to permit injection of a suppository at a point in the rectal cavity substantially higher than in manual application techniques. Typically, the length of such tubular member will vary from three to eight inches depending on the desired height of insertion.

The suppository retaining ring is, as distinguished from the tubular member, substantially solid and can be formed, for example, from a suitable metal or thermosetting plastic material such as styrene or the like. The substantially solid ring forms a seat within the forward end of the applicator which receives and holds the suppository prior to application by depressing the plunger. The retaining ring has an outside diameter slightly in excess of the normal internal diameter of the resilient tubular member such that when the ring is positioned therewithin, a press fit is provided between the ring and the tubular member.

The plunger rod, slidably disposed coaxially within the tubular member, is of a length sufficient to extend rearwardly from the tubular member, forming an ejecting handle projection. However, the length is also adjusted such that when the handle is fully depressed to eject the suppository from the retaining ring, the plunger rod extends no further than the forward end of the tubular member to prevent injury to the walls of the rectal cavity.

The positioning stop member comprises an annular O-ring having an internal diameter substantially equal to the outer diameter of the tubular member and is adapted to frictionally engage the outer surface of the tubular member, but is slidable thereupon. A cylindrical member having an overall diameter sufficiently large to provide a stop which limits the length of insertion of the tubular member into the rectal cavity cooperates with the O-ring which provides a locking function. The cylindrical member has a central aperture therein and is adapted to be coaxially disposed upon the tubular member proximate the O-ring. The internal surface of the aperture is divided into two areas, a first surface conforming generally to the cylindrical cross section of the tubular member and a second surface adjoining the first surface, having an expanding conical shape adapted to engage the O-ring when the stop member is in the locked position. The cylindrical member has an external surface tapering from the forward end toward the rear end of the tubular member such that the diameter is substantially equal to the external diameter of the tubular member on the side of the cylindrical member remote from the O-ring and tapers to a larger diameter at a point intermediate the remote end and the O-ring.

Referring now to the drawings, FIG. 1 is an external perspective view of an embodiment of the invention chosen for purposes of illustration showing the tubular member 1 slightly bent to illustrate the resiliency thereof. The apparatus of FIG. 1 is shown in the "loaded" condition with the suppository 2 inserted and seated in the forward end 3 thereof preparatory to insertion in the body cavity. A positioning stop member, generally indicated by reference character A, is positioned on the tubular member 1 and comprises an O-ring 4 and cylindrical member 5 as described above. A second stop member, generally indicated by reference character B, is shown positioned proximate the rear end of the tubular member where it is adapted to be used as a finger grip in conjunction with the plunger 6 which projects from the rear end 7 of the tubular member 1. As will be apparent, the stop member B can be omitted if desired as its function is that of providing more convenient operation of the plunger rod 6.

The embodiment of FIG. 1 is shown in cross section in FIG. 2. The tubular member 21 encloses the plunger rod 22, coaxially disposed therewithin, and if desired the tubular member can be fabricated so as to provide a projecting shoulder 21a which can provide the function of a finger grip, or the additional stop member B can be provided to serve the same function. The forward end 23 of the tubular member 21 receives a suppository retaining ring 24 which is a cylinder fabricated either of metal or suitable substantially solid plastic. The retaining ring has an outside diameter slightly larger than the internal diameter of the tubular member 21 so as to provide a press fit between the retaining ring and the tubular member. The internal diameter of the retaining ring is adjusted to provide a seat for the suppository 25 which is received and retained therewithin for application. Positive ejection of the suppository is accomplished by depressing the plunger in the direction of the arrow C.

FIG. 3 shows in greater detail the method of insertion of the retaining ring 31 into the forward end 32 of the tubular member. The retaining ring is preferably provided with a tapered portion 34 which facilitates the insertion into the tubular member 32 and provides a smooth, continuous outer surface for the tubular member rather than an abrupt shoulder which would result if the tapered portion were omitted. The forward end 32 of the tubular member is tapered as shown in the area identified by reference character 33 to facilitate comfortable insertion of the instrument into the rectal cavity without damage to the tissue. The positioning stop member A is locked by first positioning the retaining O-ring 26 at the desired point and then sliding the cylindrical member 27 in the direction of the arrow D until the expanding conical surface 28 of the top member 27 rides upon the O-ring 26 compressing its slightly to provide the locking action.

FIG. 4 illustrates a second embodiment of the invention wherein the retaining ring 41 is a hollow cone of metal cone of metal or other suitable substantially solid plastic material rather than the cylindrically shaped member of FIGS. 2 and 3. Also, FIG. 4 illustrates an alternate form of the lock positioning stop member which simply comprises a ring 42 of resilient material, suitably the same material of which the tubular member is formed. The ring is provided with a series of holes 43 therein. When the apparatus is dry, the ring 42 is locked by friction to the desired position on the tubular member 44 but can be adjustably positioned by emersing the device in water or other suitable liquid. The liquid enters the holes 43, lubricating the surface between the ring 42 and the tubular member 44 sufficiently to permit the ring 42 to slide upon the tubular member 44. After the apparatus is dry, the ring will be locked in its new position.

FIG. 5 illustrates yet another embodiment of the positioning stop member in which the cylindrical member 51 positioned coaxially upon the resilient tubular member 52 is provided with a notched forward surface 53 as shown. The notched surface provides, in effect, a series of gripping fingers 53a which provide somewhat more efficient gripping of the O-ring 54 where such is desired. To lock the positioning stop member, the cylindrical member 51 is moved upon the tubular member 52 in the direction of the arrow D.

The apparatus herein described has the distinct advantage of economical fabrication as distinguished from the devices heretofore known and available in the prior art. Such economy makes possible the disposability of these devices after use rather than retaining them and subjecting them to sterilization procedures, although the devices, because of their extreme simplicity, may be readily disassembled and reused many times after sterilization.

Various minor and immaterial changes in the precise details of construction of the apparatus of my invention will readily occur to those skilled in the art after having the benefit of the disclosure hereof. However, such minor and immaterial changes are intended to be included within the scope of the invention which is defined by a just interpretation of the following claims.

Having fully described my invention so as to enable those skilled in the art to understand and practice the same and having identified the presently preferred embodiments thereof, I claim:

1. An applicator for rectal contact laxative suppositories comprising
  (a) a resilient tubular member having a substantially smooth, continuous outer surface and an outside diameter adapted for comfortable insertion into a rectal cavity, the length of said tubular member being sufficient to permit injection of a suppository at a point in a rectal cavity substantially higher than is possible by manual application;
  (b) a substantially solid suppository retaining ring having an annular opening therein adapted to receive and hold a suppository for application, said ring being disposed coaxially within said resilient tubular member proximate the forward end thereof and having an outside diameter slightly in excess of the normal internal diameter of said tubular member to provide a press fit between said ring and said tubular member when said ring is positioned therewithin;
  (c) a resilient, flexible plunger rod slidably disposed coaxially within said tubular member and being of a length sufficient to extend rearwardly of said tubular member forming an ejecting handle projection but extending no further than the forward end thereof when said handle is fully depressed;
  (d) a positioning stop member comprising
    (i) an annular retarding O-ring having an internal diameter substantially equal to the outer diameter of said tubular member and adapted to frictionally engage the outer surface of said tubular member, but slidable thereupon; and (ii) a cylindrical member having a central aperture therein adapted for coaxial disposition upon said tubular member proximate said O-ring, the internal surface of the aperture having two surfaces, a first surface conforming generally to the cylindrical cross-section of said tubular member and a second surface adjoining said first surface having an expanding conical shape adapted to engage said O-ring when said lock stop member is in the locked position, said cylindrical member having an external surface tapered from a diameter substantially equal to the external diameter of said tubular member at the side of said cylindrical member remote from said O-ring to the diameter of said cylindrical member at a point intermediate said remote end and said O-ring.

2. Applicator of claim 1 wherein two said stop members are carried upon said tubular member, the rearmost of which forms a finger-hold for use in depressing said plunger rod.

References Cited by the Examiner

UNITED STATES PATENTS

| 973,456 | 10/1910 | Neveu | 128—241 |
| 2,170,599 | 8/1939 | Stricklen | 128—223 |
| 2,216,354 | 10/1940 | Pletcher | 128—218 |

FOREIGN PATENTS

| 222,842 | 11/1958 | Australia. |
| 1,185,845 | 8/1959 | France. |
| 1,272,301 | 8/1961 | France. |
| 1,286,634 | 1/1962 | France. |

RICHARD A. GAUDET, *Primary Examiner.*

CHARLES F. ROSENBAUM, *Examiner.*